United States Patent
Yarbrough et al.

(10) Patent No.: US 7,531,096 B2
(45) Date of Patent: May 12, 2009

(54) SYSTEM AND METHOD OF REDUCING ORGANIC CONTAMINANTS IN FEED WATER

(75) Inventors: Mark E. Yarbrough, Buckeye, AZ (US); Scott A. Takinen, Goodyear, AZ (US)

(73) Assignee: Arizona Public Service Company, Phoenix, AZ (US)

( * ) Notice: Subject to any disclaimer, the term of this patent is extended or adjusted under 35 U.S.C. 154(b) by 384 days.

(21) Appl. No.: 11/297,192

(22) Filed: Dec. 7, 2005

(65) Prior Publication Data

US 2007/0125719 A1    Jun. 7, 2007

(51) Int. Cl.
C02F 1/32 (2006.01)
C02F 1/78 (2006.01)
(52) U.S. Cl. .................. 210/748; 210/739; 210/194
(58) Field of Classification Search .......... 210/739, 210/748, 760, 194, 192
See application file for complete search history.

(56) References Cited

U.S. PATENT DOCUMENTS

| 4,126,550 | A | 11/1978 | Doerschlag |
| 5,674,312 | A | 10/1997 | Mazzei |
| 6,090,294 | A | 7/2000 | Teran et al. |
| 6,193,893 | B1 | 2/2001 | Mazzei et al. |
| 6,817,541 | B2 | 11/2004 | Sands et al. |
| 2003/0106855 | A1 | 6/2003 | Kin et al. |
| 2005/0263458 | A1 | 12/2005 | Kin et al. |

FOREIGN PATENT DOCUMENTS

JP          04007090    *  4/1990

OTHER PUBLICATIONS

"Remediation Technologies Screening Matrix and Reference Guide, Version 4.0" FRTR, Sep. 2005.
Dave Ciszewski, "Intergrated Approach to Water/Wastewater Treatment at Zero Liquid Discharge, Combined Cycle Power Plants" IONICS Pure Water Solutions, 2004.
"Ensuring Low TOC Levels in Boiler Feedwater in Belgian Nuclear Power Plant to Prevent Corrosion" IONICS The Ionics Brand of Power Solutions.

* cited by examiner

Primary Examiner—Walter D Griffin
Assistant Examiner—Cameron J Allen
(74) Attorney, Agent, or Firm—Lowell W. Gresham; Jordan M. Meschkow; Gouri G. Nair

(57) ABSTRACT

A zero liquid discharge (ZLD) power plant (20) includes an advanced oxidation system (72) for reducing contaminants in source water (70) to form feed water (40) for a boiler (24). The system (72) includes an ozonation module (86) for applying high concentration ozone to the source water (70) to form a mixed stream (104), an ozone reactor (92) in which the mixed stream is retained (104) under pressure, an ultraviolet reactor (98) downstream from the ozone reactor (92) for enhanced contaminant reduction, and a retention tank (103) downstream from the reactor (98). In one configuration, the source water (70) is evaporator distillate from an evaporator (52) that recycles cooling tower blowdown 30. The system (72) achieves organic contaminant reduction at total organic carbon (TOC) levels of less than three hundred parts per billion.

8 Claims, 3 Drawing Sheets

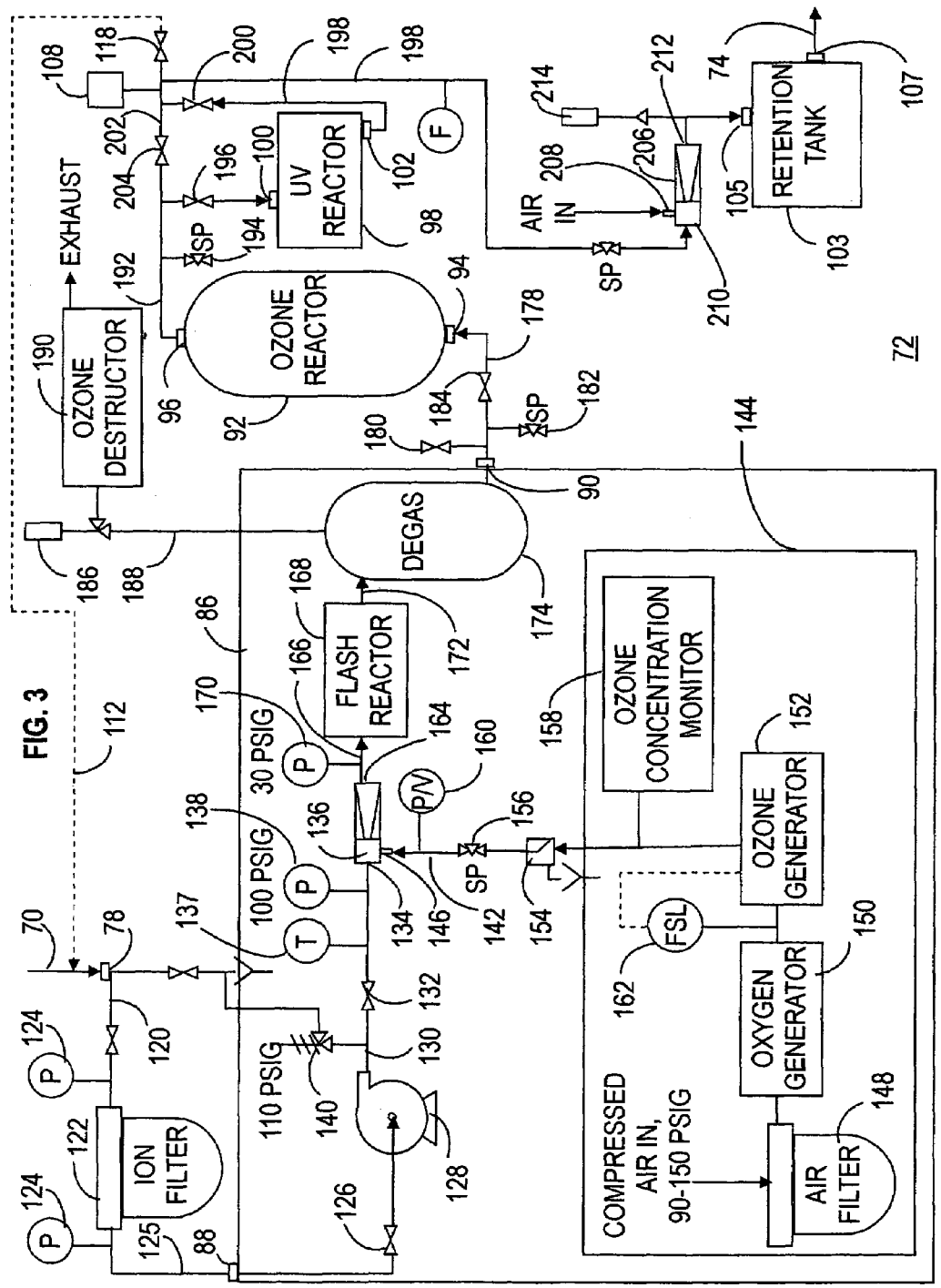

SYSTEM AND METHOD OF REDUCING ORGANIC CONTAMINANTS IN FEED WATER

TECHNICAL FIELD OF THE INVENTION

The present invention relates to the field of power generating plants. More specifically, the present invention relates to forming feed water for a boiler system of a power plant configured for zero liquid discharge.

BACKGROUND OF THE INVENTION

Power generation is a water intensive process. In a conventional thermal power plant, fuel, such as natural gas, coal, oil, and the like, may be combusted in a boiler system. Heat released during combustion is absorbed into water-cooled walls of the boiler where the water boils and steam is formed. High temperature superheated steam passes into a steam turbine. The high temperature and pressure of the steam causes the steam turbine to rotate to drive an electric generator. The condensed steam is subsequently collected and returned through a series of pumps and heat exchangers to the boiler to repeat the cycle. Heat is extracted from the condensed steam by cooling water that is pumped to one or more cooling towers so that the waste heat can be released into the atmosphere through evaporation of the cooling water.

The degree of water reuse in the cooling towers is limited by dissolved solids in the water. That is, as the water evaporates in the cooling tower, the dissolved solids concentrate. When the concentration of dissolved solids becomes high enough, waste water, referred to as blowdown, is discharged from the cooling-tower. Consequently, feed water, also known as make up water, must be introduced into the cooling tower to replace the quantity lost to evaporation and blowdown. Make up water to the cooling tower is the largest water consumer in the power plant.

The boiler system is the final collection point for all corrosive and scale-producing contaminants generated upstream. These contaminants include minerals, organic material, atmospheric gases, and so forth. Water and steam in the boiler system are in constant contact with metal surfaces threatening the integrity of plant equipment. Corrosion can occur when metal ions transfer from a base metal to water and combine with oxygen to become hydroxides and solid metal hydroxides that can deposit on heat exchange surfaces, heaters, pumps, boiler tubes, turbines, and the like. The deposits interfere with heat transfer across the tubes which lowers the overall cycle efficiency, and can cause local tube overheating failures. Deposits can also significantly lower the efficiency of the turbines and, in turn, become corrosion sites when dissolved solids trapped in the deposit concentrate as the liquid boils away. Eventually, the concentration reaches highly corrosive levels and severe under-deposit corrosion occurs.

Like the cooling tower, when the level of dissolved solids in the boiler water becomes great enough, blowdown is discharged from the boiler system, often to the cooling towers, to reduce the contaminants that can otherwise cause severe scaling or corrosion problems. Consequently, feed water must be introduced in the boiler water to replace the quantity lost.

Organic material contaminants also pose a problem in boiler feed water. The breakdown of organic materials in boiler feed water can result in the formation of acetic and other organic acids that can corrode the boiler and associated boiler plumbing. Total Organic Carbon (TOC) is a measure of the amount of organic material suspended or dissolved in water. While acceptable levels of organic material may be one to six parts per million TOC in the cooling water, the TOC level in boiler feed water should be significantly lower. The degree of purification required for boiler feed water depends on the operating pressure of the boiler. The higher the boiler pressure, the higher the purity requirements. The American Society of Mechanical Engineers (ASME) has put together standards for the quality of boiler feed water at various drum operating pressures. Regarding organic materials, for a 300-pounds-per-square-inch (psi) boiler, the feed water should have less than 1,000 part per billion (ppb) of nonvolatile TOC. However, for a 2,000-psi boiler, the feed water should have less than 200 ppb nonvolatile TOC.

Competition for water resources among power generators and residential, commercial, industrial, and agricultural users is increasing. Indeed, water shortage is a chronic problem in some regions prone to drought and where population growth is increasing rapidly. Zero Liquid Discharge (ZLD) systems are becoming widely used in the power industry to address problems associated with limitations on water availability, increasing concern for conservation of fresh water supplies, environmental restrictions on discharges, and lengthy permitting processes. In a typical ZLD system, blowdown from the cooling towers is recycled into high purity water for reuse so that the liquid waste stream from the cooling towers is largely eliminated. In some cases, plant water consumption can be reduced from 10-90% with the addition of a ZLD system. This can minimize the potential environmental risk associated with plant waste streams and help improve unfavorable public perceptions of new facilities. Moreover, in areas of acute water shortages, ZLD design can help optimize the overall facility life cycle costs.

In some cases, the reduction of TOC levels to acceptable standards in ZLD systems has been limited. That is, the TOC level can be reduced low enough for use as cooling tower feed water, but the TOC level cannot be reduced low enough for use as boiler feed water. This problem is exacerbated in high pressure boiler systems, and/or when the feed water is lightly treated sewage effluent. In general, such effluent is low in alkalinity, high in sulfates and chlorides, and is very sensitive to swings in algae populations due to changing nutrient levels, water temperatures, dissolved gas concentrations, and so forth. The variations in algae populations in the effluent dictate the levels of organic materials, measured in TOC, that might eventually be input as feed water into the boiler system.

Consequently, continuing demand exists for an effective process and system which can reliably provide feed water of a desired purity for use as boiler feed water, as is required in a zero liquid discharge power plant.

SUMMARY OF THE INVENTION

Accordingly, it is an advantage of the present invention that a method and system for reducing organic contaminants in source water to form feed water for a boiler system of a power plant are provided.

It is another advantage of the present invention that a method and system are provided that reduce organic contaminants in source water to a total organic carbon (TOC) level of less than three hundred parts per billion.

Another advantage of the present invention is that a method and system are provided that are effectively implemented and economically viable in a zero liquid discharge power plant.

The above and other advantages of the present invention are carried out in one form by a method for reducing organic contaminants in source water to form feed water for a boiler system of a zero liquid discharge power plant. The method calls for receiving the source water at an inlet port of a pressurized advanced oxidation system. The pressurized advanced oxidation system is utilized to reduce the organic contaminants in the source water to form the feed water having a total organic carbon (TOC) level representing the organic contaminants of less than three hundred parts per billion. The product water is then conveyed toward the boiler system.

The above and other advantages of the present invention are carried out in another form by a system for reducing organic contaminants in evaporator distillate to form feed water for a boiler system of a zero liquid discharge power plant, the evaporator distillate being produced in an evaporator from blowdown water conveyed to the evaporator from a cooling tower. The system includes an ozonation module having an inlet port for receiving the evaporator distillate from the evaporator and applying ozone to the evaporator distillate to form a mixed stream. An ozone reactor has an ozone reactor inlet in fluid communication with an outlet port of the ozonation module for receiving the mixed stream and retaining the mixed stream in the ozone reactor for a predetermined duration at an operating pressure greater than atmospheric pressure. The system further includes an ultra violet (UV) reactor having a UV reactor inlet in fluid communication with an ozone reactor outlet of the ozone reactor for receiving the mixed stream and exposing the mixed stream to UV wavelength to enhance reduction of the organic contaminants to form the feed water having a TOC level representing the organic contaminants of less than three hundred parts per billion, and the UV reactor having a UV reactor outlet in fluid communication with the boiler system.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a block diagram of the advanced oxidation system of FIG. 2.

DETAILED DESCRIPTION OF THE PREFERRED EMBODIMENTS

The present invention includes a system and methodology for reducing organic contaminants to form feed water for a facility that incorporates zero liquid discharge (ZLD) techniques to reduce or eliminate waste water discharge into the environment. In particular, the present invention reduces organic contaminants in water output from a ZLD water treatment system implemented in a ZLD power plant. Total organic carbon (TOC) levels provide a measure of the amount of organic contaminants suspended or dissolved in water. Consequently, the present invention reduces organic contaminants in water, and verifies that reduction through the measurement of a TOC level in the product water.

A high TOC level found in evaporator distillate produced by a brine concentrator of a ZLD treatment system is of particular concern to the present invention. This evaporator distillate having a high TOC level, in excess of 300 ppb (parts per billion), is unsuitable for boiler feed water of a ZLD power plant because organic contaminants in the distillate can breakdown and result in the formation of acetic and other organic acids that can corrode the boiler and associated boiler plumbing. The present invention reduces organic contaminants in this evaporator distillate. Those skilled in the art will recognize that the present invention may be implemented in a number of ZLD power plant configurations and other facilities that utilize ZLD techniques in which TOC levels in the feed water are undesirably high.

Figure 1:
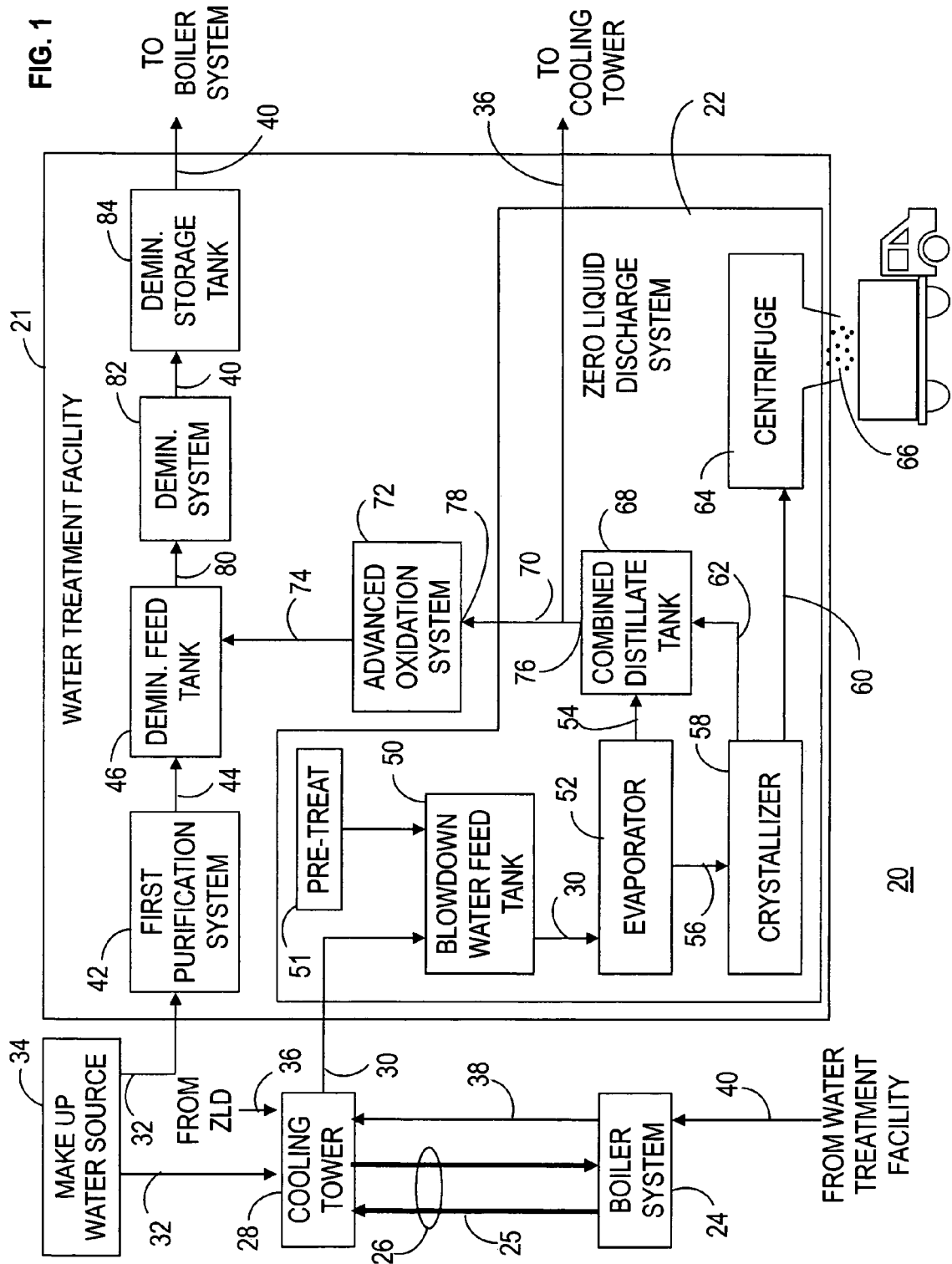
FIG. 1 shows a block diagram of a portion of a power plant having a zero liquid discharge (ZLD) treatment system incorporated therein.

FIG. 1 shows a block diagram of a portion of a power plant 20 that includes a water treatment facility 21 having a zero liquid discharge (ZLD) treatment system 22 incorporated therein. In general, power plant 20 includes a boiler system 24 in which a fuel, such as natural gas, coal, oil, and the like, is combusted. Per conventional processes, heat released during combustion is absorbed into the water-cooled walls of boiler system 24 where the water boils and steam is formed. The superheated steam passes into a steam turbine (not shown), and the steam rotates the steam turbine to drive an electric generator (not shown). The condensed steam is collected and returns through a series of pumps and heat exchangers into boiler system 24 to repeat the cycle.

Heat is extracted by cooling water, represented by an arrow 25, via a cooling loop 26 interposed between boiler system 24 and a cooling tower 28. Cooling tower 28 may be equipped with fans (not shown) that draw air through the heated cooling water to evaporate some of the water and cool the remainder. Cooling water 25 is returned to boiler system 24 via cooling loop 26 to continue the condensation process. Cooling water 25 in cooling loop 26 is occasionally discharged from cooling tower 28 as cooling tower blowdown, represented by an arrow 30, to remove or decrease unwanted contaminants.

Make up water, represented by an arrow 32, from a make up water source 34 replaces some of the quantity lost to evaporation and lost as cooling tower blowdown 30. Make up water 32 may be tertiary treated sewage effluent that has high levels of corrosive and scale-producing contaminants such as minerals, organic material, atmospheric gases, and so forth. Treated cooling tower feed water, represented by an arrow 36, from ZLD system 22 also replaces some of the quantity lost to evaporation and lost as cooling tower blowdown 30, so as to minimize the water usage from make up water source 34.

Boiler system blowdown, represented by an arrow 38, is also occasionally discharged from boiler system 24 to remove or decrease undesirable contaminants in boiler water. Boiler system blowdown 38 may be discharged to cooling tower 28. High purity boiler feed water, represented by an arrow 40, from water treatment facility 21 replaces the quantity lost as boiler system blowdown 38.

Cooling tower blowdown 30 is input into ZLD system 22 of water treatment facility 21 where it is treated to remove contaminants so that cooling tower blowdown 30 can be returned to either of cooling tower 28 and/or boiler system 24. In addition, make up water 32 from make up water source 34 may be input into water treatment facility 21 where it is treated to remove contaminants to form a portion of boiler feed water 40 for input into boiler system 24.

In this exemplary configuration, water treatment facility 21 includes a first purification system 42 adapted to receive contaminated make up water 32 from make up water source 34. First purification system 42 may include a multimedia filter, carbon bed, reverse osmosis system, and the like known to those skilled in the art to reduce contaminants in make up water 32. First purification system 42 yields first feed water, represented by an arrow 44.

With particular regard to organic contaminants, make up water 32 may have organic contaminants at TOC levels in excess of 8000 ppb. First purification system 42 can reduce the organic contaminants in make up water 32 to produce first feed water 44 having a TOC level of, for example, approximately 50 ppb. First feed water 44 is input into a demineralization feed tank 46 in fluid communication with first purification system 42.

Water treatment facility 21 further includes a second purification system, in the form of ZLD system 22, adapted to receive source water, in this case, cooling tower blowdown 30 from cooling tower 28. Cooling tower blowdown 30 is received in a blowdown water feed tank 50 of ZLD system 22. In accordance with the present invention, cooling tower blowdown 30 in tank 50 may optionally be pre-treated with an organic contaminant reducing agent (PRE-TREAT) 51. Such reducing agents may include chlorination and aeration at the intake of tank 50, filtration, and/or biocide addition to cooling tower 28, and cleaning of the sludge from cooling tower sump. Such pre-treatment can cost effectively reduce the amount of organic contaminants prior to downstream reduction of organic contaminants (discussed below)

Cooling tower blowdown 30 exits feed tank 50 and is input into an evaporator system 52. Evaporator system 52 may be a brine concentrator. As known to those skilled in the art, a brine concentrator is a seeded-slurry, falling-film evaporator that converts highly saturated waste water into distilled water for reuse. In this capacity, brine concentrator of evaporator system 52 processes the received cooling tower blowdown 30 and outputs distilled evaporate, represented by an arrow 54. Brine concentrator of evaporator system 52 may recover in excess of ninety percent of cooling tower blowdown 30 as relatively high purity distillate 54. The remaining slurry, represented by an arrow 56, is sent to a crystallizer 58.

Crystallizer 58 reduces slurry 56 to solids 60 and recovery water, represented by an arrow 62. Solids 60 may be further processed in a centrifuge 64 to produce dry solids 66 suitable for offsite utilization and/or disposal. A combined distillate tank 68 is in communication with an output of each of evaporator 52 and crystallizer 58. Distilled evaporate 54 from evaporator 52 and recovery water 62 from crystallizer 58 are mixed in combined distillate tank 68 to form a combined distillate, represented by an arrow 70.

It has been determined that combined distillate 70 has elevated TOC levels, in the range of 1-10 ppm. Elevated TOC levels in combined distillate 70 originate as organic compounds cycled in cooling tower 28 and broken down under temperature in evaporator 52, forming a combination of high molecular weight polar organic compounds and low molecular weight nonpolar organic compounds. These polar and nonpolar organic compounds are likely transported to combined distillate 70 through a steam carryover mechanism. When the steam is condensed in evaporator 52, the organic contaminants are entrained in the distillate stream. Unfortunately, while combined distillate 70 may be suitable for use as treated cooling tower feed water 36 to cooling-tower 28, TOC levels are too high for use as feed water 40 to boiler system 24.

Removal of the polar organic compounds can be achieved through conventional absorption or exchange. However, reduction of low molecular weight nonpolar organic compounds is achieved through the implementation of a pressurized advanced oxidation system 72 in accordance with a preferred embodiment of the present invention. Advanced oxidation system 72 breaks the carbon bonds in combined distillate 70 to convert the organic contaminants to carbon dioxide and second feed water, represented by an arrow 74. Through the utilization of advanced oxidation system 72, organic contaminants found in combined distillate 70 exiting from an outlet 76 of distillate tank 68 are reduced to TOC levels of less than 300 ppb. In addition, advanced oxidation may condition the nonpolar organic compounds, making them polar and therefore exchangeable on a downstream mixed bed demineralization system. Advanced oxidation system 72 is discussed in greater detail in connection with FIGS. 2-3.

Following advanced oxidation in system 72, second feed water 74 is received in demineralization feed tank 46. First and second feed water 44 and 74, respectively, mix in demineralization feed tank 46 and the combined feed water, represented by an arrow 80 is input into a demineralization system 82. Demineralization system 82 executes a demineralization process, also known as deionization, to remove dissolved minerals from combined feed water 80 to make it suitable for use as boiler feed water 40. Demineralization system 82 may demineralize combined feed water 80 using chemically-regenerated ion exchange (IX) resins or electrically-driven membrane devices. Following demineralization at demineralization system 82, highly purified water produced by demineralization system 82 may be stored in a demineralization storage tank 84 until needed as boiler feed water 40 for boiler system 24.

Through the effective purification of second feed water 74 via evaporator system 52, crystallizer 58, and advanced oxidation system 72, second feed water 74 significantly supplements first feed water 44 produced by the reverse osmosis system of first purification system 42 to yield high purity boiler feed water 40. Consequently, power plant 20 utilizes less make-up water 32 and more successfully achieves the objective of zero liquid discharge.

Figure 2:
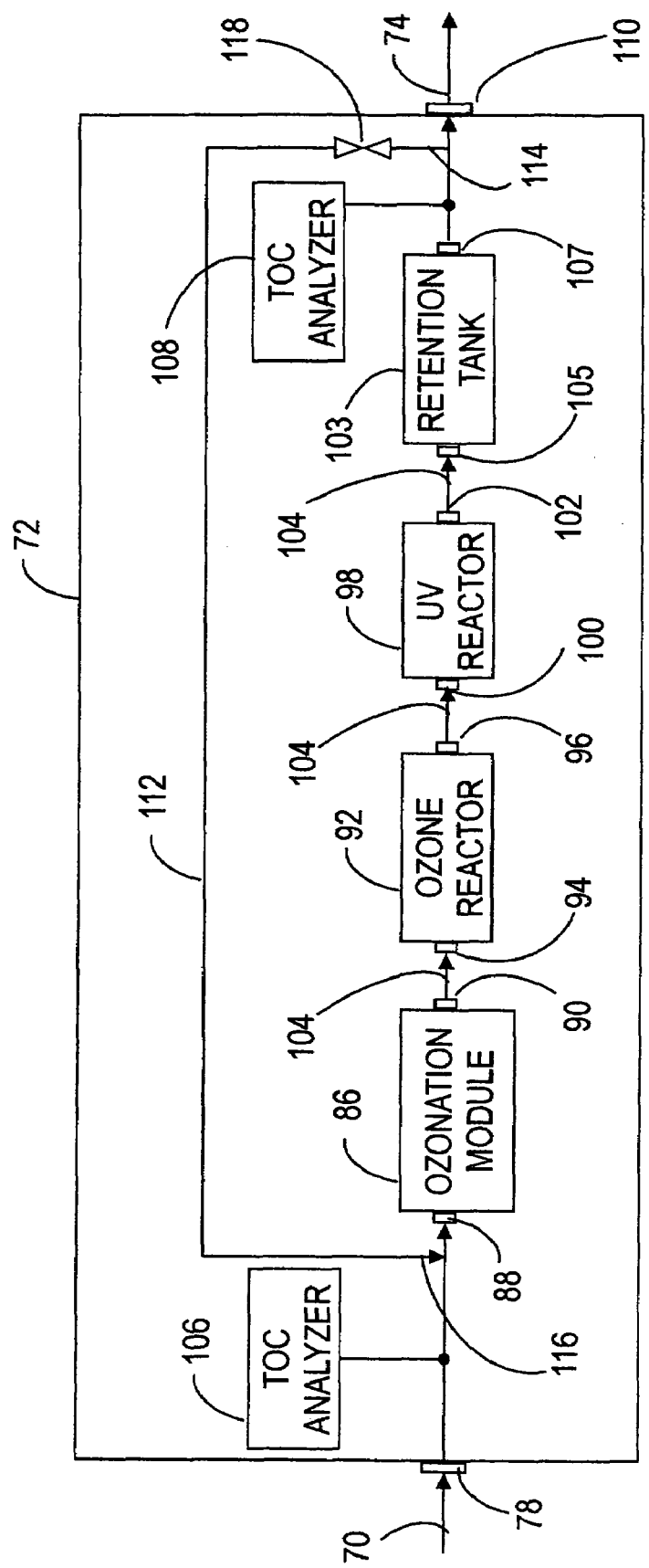
FIG. 2 shows a block diagram of primary functional components of an advanced oxidation system incorporated into the ZLD treatment system of FIG. 1.

FIG. 2 shows a block diagram of the primary functional components of advanced oxidation system 72 incorporated into ZLD system 22 (FIG. 1). Advanced oxidation system 72 generally includes an ozonation module 86 having an inlet port 88 for receiving combined distillate 70 from combined distillate tank 68 (FIG. 1), and having an outlet port 90. An ozone reactor 92 has a reactor inlet 94 in fluid communication with an outlet port 90, and a reactor outlet 96. An ultra violet (UV) reactor 98 has a UV reactor inlet 100 in fluid communication with reactor outlet 96, and a UV reactor outlet 102. A retention tank 103 has a tank inlet 105 in fluid communication with UV reactor outlet 102, and a tank outlet 107 in fluid communication with boiler system 24 (FIG. 1) via demineralization system 82 (FIG. 1).

In general, ozonation module 86 generates ozone (discussed below) and applies the ozone to combined distillate 70 to form a mixed stream, represented by an arrow 104, of distillate 70 and ozone. In accordance with a preferred embodiment, mixed stream 104 is conveyed to ozone reactor 92 where mixed stream 104 is retained for a pre-determined duration to reduce the organic contaminants in mixed stream 104. Following the pre-determined duration, mixed stream 104 is output from ozone reactor 92 and conveyed into UV reactor 98. Mixed stream 104 is exposed to UV wavelength in UV reactor the reduction of organic contaminants in mixed stream. Finally, mixed stream 104 is output from UV reactor 98 and conveyed into retention tank 103 where mixed stream 104 is again retained for a pre-determined duration to assure thorough reduction of organic contaminants and allow time for off-gassing of the carbon dioxide produced by the reduction of organic contaminants in mixed stream 104, thus producing high purity second feed water 74.

Through the implementation of advanced oxidation system 72, a UV oxidation process is performed to reduce organic contaminants in combined distillate 70. In particular, advanced oxidation system 72 produces hydroxyl radicals (OH), a highly reactive oxidizing agent. Oxidation is thus caused by direct reaction with hydroxyl radicals, UV photolysis, and through the synergistic action of UV wavelength in combination with ozone. If complete conversion is achieved, the final products of the UV oxidation process carried out by advanced oxidation system 72 are carbon dioxide, water, and salts. Although advanced oxidation system 72 employs an ozone/UV process, those skilled in the art will recognize that other advanced oxidation technologies may alternatively be applied.

The rate of organic contaminant reduction is a function of transferring the ozone from a gas phase to a liquid phase to produce the oxidizing hydroxyl radicals (OH). The more efficient this transfer, the higher the rate of organic contaminant reduction. Important controls on ozone transfer efficiency include pressure, temperature, reaction time, ionic strength, and ozone feed. Regarding pressure, Henry's Law states that the solubility of a gas is proportional to the partial pressure of the gas. Therefore, if the pressure is increased, the solubility of ozone increases, so that the concentration of liquid phase ozone increases. A decrease in the temperature will increase the solubility of ozone, and an increase in the reaction time will commensurately increase the transfer efficiency of ozone. A decrease in the ionic strength will also increase ozone solubility. However, combined distillate 70 is approximately 20-25 µohm, so it already exhibits very low ionic strength.

A high ozone concentration facilitates high ozone solubility. This high solubility is the driving force for ozone mass transfer. High ozone concentration is not without its complications however. For example, the discharge of gaseous ozone into the atmosphere is very strictly regulated. Excess ozone which is not dissolved in mixed stream 104 is not permitted to be discharged into the atmosphere, causing some systems to operate at lower ozone concentrations and/or to utilize ozone destructor systems.

In this scenario, combined distillate 70 is approximately one hundred and ten degrees Fahrenheit. It is highly undesirable to cool combined distillate 70 to increase ozone solubility due to excessive cost ramifications and equipment complexity. Therefore, the present invention capitalizes on pressure, reaction time, and high ozone concentration as primary controls in ozone transfer efficiency.

Advanced oxidation system 72 preferably reduces organic contaminants in combined distillate 70 in a single pass, continuous operational mode to produce second feed water 74. In order to verify the reduction of organic contaminants in second feed water 74 to suitable TOC levels, advanced oxidation system 72 may further include a first TOC analyzer 106 proximate inlet port 78 for analyzing a TOC level of combined distillate 70. A second TOC analyzer 108 may be positioned proximate an outlet port 110 of system 72 for analyzing a TOC level of second feed water 74.

In a preferred embodiment, first and second TOC analyzers 106 and 108, respectively, are on-line instruments configured to determine TOC levels in or near real-time. Alternatively, first and second TOC analyzers 106 and 108 operate off-line, and advanced oxidation system 72 may include sample ports from which samples of combined distillate 70 and/or second feed water 74 may be collected for analysis of organic contaminants.

Advanced oxidation system 72 optionally includes a feedback conduit 112 having an inlet 114 located downstream from second TOC analyzer 108, and having an outlet 116 located upstream from ozonation module 86. Water flow through feedback conduit 112 is controlled by a valve. 118 (discussed below)

Second TOC analyzer 108 measures the TOC level of feed water 74, and may optionally compare it to the TOC level of combined distillate 70. When the TOC level of feed water 74 is less than a predetermined maximum level, such as three hundred parts per billion, second feed water 74 is output from advanced oxidation system 72 for eventual conveyance to boiler system 24 (FIG. 1). However, when the TOC level of feed water 74 is greater than the predetermined maximum level, valve 118 opens so that feed water 74 is directed back to ozonation module 86, and system 72 can thus be utilized to further reduce the organic contaminants in second feed water 74.

Preferably such a multiple pass approach through advanced oxidation system 72 is avoided to as great an extent possible because the transfer efficiency of ozone from a gas phase to a liquid phase is reduced with each pass. The transfer efficiency is reduced because the water contains greater levels of oxygen and carbon dioxide gas, thus reducing the ozone gradient. As such, the water cannot hold as much ozone in multiple passes as on the first pass. However, under conditions of exceedingly high TOC levels, advanced oxidation system 72 includes feedback conduit 112 to accommodate a multiple pass situation.

FIG. 3 shows a block diagram of advanced oxidation system 72. Advanced oxidation system 72 operates efficiently to transfer gas phase ozone to liquid phase ozone so as to thoroughly reduce nonpolar organic contaminants in combined distillate 70. Reduction is achieved through the operation of system 72 under conditions of high pressure, high ozone concentration, and extended reaction time capability.

Combined distillate 70 enters system 72 through inlet port 78 and is conveyed in a conduit 120 to an ion filter 122. Ion filter 122 may be a one micron filter that filters any particulate matter (i.e. total suspended solids) that might be in combined distillate 70. A pair of pressure indicators 124 on the input and output sides of ion filter 122 provide a pressure difference indication between the input and output of ion filter 122. Differential pressure is employed to determine when to change out ion filter 122.

A conduit 125 conveys the filtered distillate 70 into inlet port 88 of ozonation module 86 through a selectively closable valve 126 to a pump 128. Pump 128 is a booster or supply pump to assure that the downstream system is supplied with distillate 70 at the necessary system pressure. In an exemplary embodiment, pump 128 may supply distillate 70 at a rate of three gallons per minute and approximately 100 psig.

A conduit 130 conveys distillate 70 from pump 128 through a selectively closable valve 132 to a fluid inlet 134 of an injector 136. A temperature indicator 137 and a pressure indicator 138 determine temperature and pressure of distillate 70 entering injector 136. As discussed above, due to the origin of distillate 70, its temperature is likely to be approximately 110° F. and pressure of distillate 70 exiting pump 128 is approximately 100 psig. A conventional pressure relief system 140 may be in fluid communication with conduit 130. Pressure relief system 140 serves as a safety mechanism to ensure that the pressure in conduit 130 does not exceed a predetermined limit, such as, for example, 110 psig.

A conduit 142 conveys ozone from an ozone generating system 144 to an injector port 146 of injector 136. Ozone generating system 144 includes conventional elements, such as an air filter 148 for receiving compressed air at pressures in a range of, for example, 90-150 psig, and an oxygen generator 150 for concentrating the oxygen out of the compressed air.

An ozone generator 152 receives oxygen from oxygen generator 150 and produces ozone by conventional processes. The ozone is conveyed in conduit 142 through a backflow preventer 154 and a sample port (SP) 156. An ozone concentration monitor 158 in communication with conduit 142 monitors the concentration of the conveyed ozone, and a pressure gauge 160 in communication with conduit 142 is scaled to determine pressure (positive values) or vacuum (negative values) in conduit 142. Per convention, a flow switch low indicator 162 determines whether flow of oxygen from oxygen generator 150 to ozone generator 152 is lost. Should such a loss occur, a signal is sent from indicator 162 to ozone generator 152 to activate a protective trip to shut down ozone generator 152.

Combined distillate 70 and ozone are combined in injector 136, which is a high-efficiency, Venturi-type, differential pressure injector. As such, when pressurized distillate 70 enters fluid inlet 134, distillate 70 is constricted toward an injection chamber and changes into a high-velocity jet stream. The increase in velocity through injector 136 results in a pressure decrease, thereby enabling ozone to be aspirated through injector port 146 and entrained in distillate 70 to form mixed stream 104 (FIG. 2). As mixed stream 104 is diffused toward a fluid outlet 164 of injector 136, its velocity is reduced and it is reconverted into pressure energy, although at a pressure lower than the injector inlet pressure detected at pressure indicator 138. Injector 136 may aspirate ozone gas from ozone generator 152 at one to fifteen percent, but preferably in excess of ten percent, weight to provide dynamic mixing and mass transfer.

A conduit 166 conveys mixed stream 104 from fluid outlet 164 of injector 136 to a flash reactor 168. A downstream pressure indicator 170 provides an indication of the pressure of mixed stream 104 exiting from fluid outlet 164. In a preferred embodiment, the pressurization of system 72 will drop relative to the inlet pressure at fluid inlet 134 of injector 136, but remain greater than atmospheric pressure. For example, the system operating pressure may drop to approximately 20-30 psig. The pressurization of system 72 downstream from injector 136 increases the solubility of the ozone in mixed stream 104. That is, the higher the pressure, the greater the transfer of ozone from a gas phase to a liquid phase in mixed stream 104 so as to produce oxidizing hydroxyl radicals (OH).

At flash reactor 168, the dissolution of ozone in gas phase to ozone in liquid phase is enhanced. A conduit 172 next conveys mixed stream 104 (FIG. 2) from flash reactor 168 to a de-gassing separator (DEGAS) 174. De-gassing separator 174 has a liquid outlet port which discharges mixed stream 104 through a conduit 178 to outlet port 90 of ozonation module 86. Mixed stream 104 is conveyed in conduit 178 past an optional access port 180, a sample port 182, and through a selectively closeable valve 184 to ozone reactor inlet 94. Mixed stream 104 subsequently enters ozone reactor 92.

A de-gasser relief valve 186 is fitted to de-gassing separator 174 via a conduit 188 to release accumulated gas. Valve 186 is responsive to the relative amounts of gas and liquid in de-gassing separator 174, and will release accumulated gases which can be properly discharged to the atmosphere. However, if the separated gases include gaseous ozone, then conduit 188 will convey the gaseous ozone to an ozone destructor 190 for the appropriate recovery treatment.

Mixed stream 104 (FIG. 2) is retained in ozone reactor 92 at an operating pressure greater than atmospheric pressure. This operating pressure is desirably at a level greater than twenty pounds per square inch gauge. In addition, mixed stream 104 is retained in ozone reactor 92 for a predetermined duration, for example, in excess of ten minutes. This predetermined duration enables sufficient reaction time in order to increase the transfer efficiency of ozone from a gaseous state to a liquid state. The combination of pressurization in system 72 of greater than atmospheric pressure combined with long ozone reaction time in ozone reactor 92 yields an advanced oxidation system 72 that efficiently increases the solubility of ozone, even at the elevated temperatures of combined distillate 70, to facilitate the reduction of organic contaminants in mixed stream 104.

A conduit 192 conveys mixed stream 104 from ozone reactor outlet 96 past a sample port 194, through a selectively closable valve 196, and into UV reactor 98 via UV reactor inlet 100. At UV reactor 98, organic contaminants in mixed stream 104 are further reduced by the synergistic action of ozone and exposure to ultra violet wavelength. Mixed stream 104 exits UV reactor at UV reactor outlet 102, and a conduit 198 conveys mixed stream 104 through a selectively closable valve 200 to tank inlet 105 of retention tank 103.

Advanced oxidation system 72 may include an optional bypass conduit 202 with closable valve 204 interposed between conduit 192 and conduit 198 so that UV reactor 98 can be selectively bypassed. Furthermore, TOC analyzer 108 may be in-line with conduit 198 for determining TOC level of mixed stream 104 (FIG. 2) following ultra violet irradiation. As discussed in connection with FIG. 2, TOC analyzer 108 may determine that organic contaminants in second feed water 74 have not dropped to a low enough TOC level, for example, less than 300 ppb. Consequently, valve 118 may optionally be opened to allow liquid flow into feedback loop 112 for additional organic contaminant reduction, as needed.

Under preferred conditions, however, mixed stream 104 is conveyed from UV reactor 98 via conduit 198 to retention tank 103. At retention tank 103, further reaction may occur for a pre-determined duration to assure thorough conversion of organic contaminants to carbon dioxide, water, and salts. A Venturi-type differential injector 206 located upstream from tank 103 aspirates air through an injector port 208 as mixed stream 104 enters a fluid inlet 210 of injector 206, and results in a pressure decrease at a fluid outlet 212 of injector 206. In a preferred embodiment, system 72 is depressurized at injector 206. That is, the system operating pressure drops at injector 206 from the 20-30 psig seen upstream to approximately atmospheric pressure in retention tank 103.

Reaction tank 103 includes a de-gassing vent 214 from which the gaseous products of the advanced oxidation process can be vented. Under conditions of complete conversion this gaseous product is carbon dioxide and the air aspirated at injector 206. Second feed water 74 is subsequently discharged from retention tank 103 via tank outlet 107. High purity second feed water 74 having a TOC level of less than 300 ppb can then be fed into demineralization feed tank 46 (FIG. 1) for subsequent demineralization, as discussed above.

In summary, the present invention teaches methodology and a system for reducing organic contaminants in source water to form feed water for a boiler system of a power plant. The system entails the utilization of an advanced oxidation system incorporated into a zero liquid discharge treatment system. The advanced oxidation system operates under high pressure, high ozone concentration, and extended reaction time conditions to thoroughly reduce organic contaminants in high temperature source water, such as evaporator distillate. The advanced oxidation system achieves organic contaminant reduction in source water to total organic carbon (TOC) levels of less than three hundred parts per billion. An advanced oxidation system for the disinfection of evaporator distillate from a brine concentrator is readily incorporated into a zero liquid discharge treatment system resulting in high purity water that can be fed into a boiler system, thereby reducing demands on a more costly reverse osmosis system that purifies lightly treated sewage effluent or other contaminated water.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for reducing organic contaminants in water output from a zero liquid discharge (ZLD) treatment system to form feed water for a ZLD facility, said water comprising evaporator distillate produced from source water in an evaporator of said ZLD treatment system, said method comprising:
pre-treating said source water with an organic contaminant reducing agent before conveyance to said evaporator of said ZLD treatment system;
receiving said water from said ZLD treatment system at an inlet port of an advanced oxidation system, said advanced oxidation system including an ozonation module in fluid communication with said inlet port, an ozone reactor in fluid communication with said ozonation module, and an ultra violet (UV) reactor in fluid communication with said ozone reactor; and
utilizing said advanced oxidation system to reduce said organic contaminants in said water to form said feed water for conveyance into said ZLD facility, said utilizing operating including:
applying ozone to said water in said ozonation module to form a mixed stream;
conveying said mixed stream to said ozone reactor;
retaining said mixed stream in said ozone reactor for a pre-determined duration to reduce said organic contaminants in said mixed stream;
following said pre-determined duration, outputting said mixed stream from said ozone reactor to said UV reactor; and
exposing said mixed stream to UV wavelength in said UV reactor to enhance reduction of said organic contaminants in said mixed stream to form said feed water.

2. A method as claimed in claim 1 wherein said ZLD treatment system reduces said organic contaminants in said source water to a first level to produce said water, and said utilizing operation comprises reducing said organic contaminants in said water to a second level to produce said feed water, said second level being less than said first level.

3. A method as claimed in claim 1 wherein said applying operation comprises forming said mixed stream to have a concentration of said ozone of greater than ten percent.

4. A method as claimed in claim 1 wherein said retaining said mixed stream in said ozone reactor occurs at an operating pressure greater than atmospheric pressure.

5. A method as claimed in claim 4 further comprising selecting said operating pressure at a level greater than twenty pounds per square inch gauge.

6. A method for reducing organic contaminants in water output from a zero liquid discharge (ZLD) treatment system to form feed water for a ZLD facility, said method comprising:
receiving said water from said ZLD treatment system at an inlet port of an advanced oxidation system;
utilizing said advanced oxidation system to reduce said organic contaminants in said water to form said feed water for conveyance into said ZLD facility, said advanced oxidation system including an ozonation module in fluid communication with said inlet port, an ozone reactor in fluid communication with said ozonation module, an ultra violet (UV) reactor in fluid communication with said ozone reactor, a retention tank in fluid communication with an outlet of said UV reactor, and said utilizing operation including:
applying ozone to said water in said ozonation module to form a mixed stream;
conveying said mixed stream to said ozone reactor;
retaining said mixed stream in said ozone reactor for a pre-determined duration to reduce said organic contaminants in said mixed stream;
following said pre-determined duration, outputting said mixed stream from said ozone reactor to said UV reactor;
exposing said mixed stream to UV wavelength in said UV reactor to enhance reduction of said organic contaminants in said mixed stream; and
holding said mixed stream in said retention tank for a second pre-determined duration to form said feed water.

7. A method as claimed in claim 1 further comprising filtering, prior to said utilizing operation, suspended solids of said organic contaminants from said source water.

8. A method as claimed in claim 1 wherein said utilizing said advanced oxidation system reduces nonpolar molecules of said organic contaminants.

* * * * *